United States Patent Office 3,371,942
Patented Mar. 5, 1968

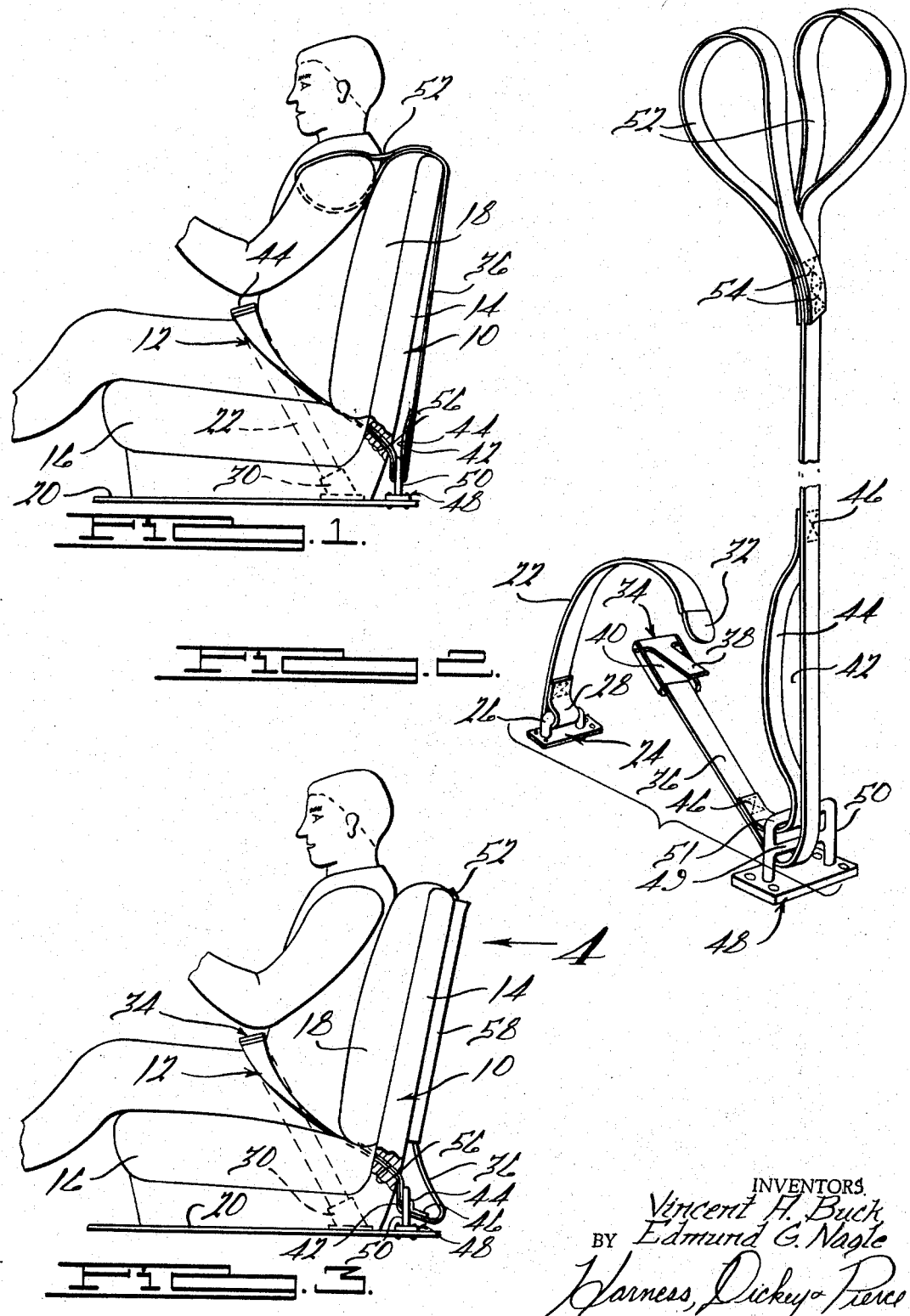

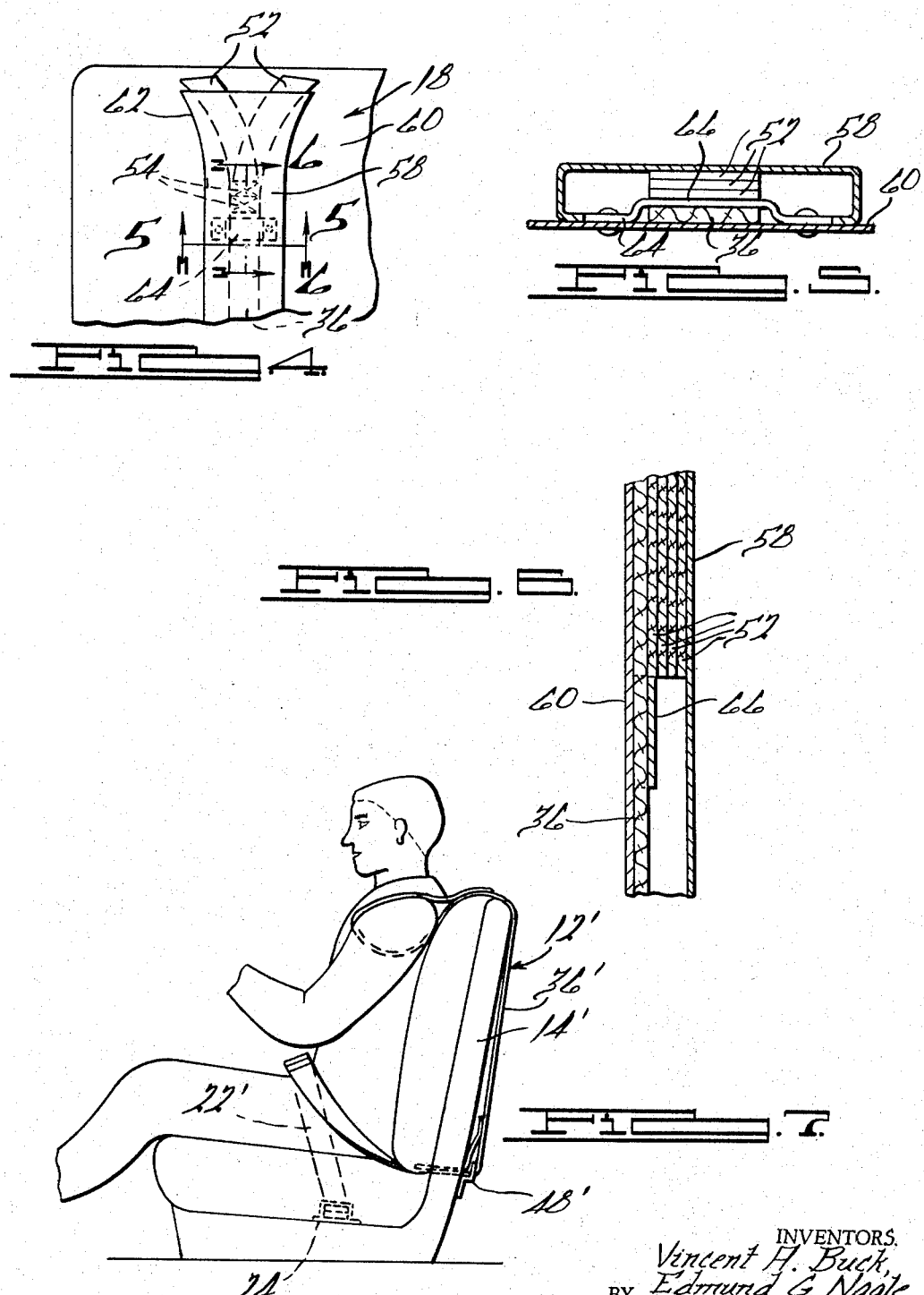

3,371,942
COMBINATION SEAT BELT AND UPPER
TORSO RESTRAINT
Vincent A. Buck, Huntington Woods, and Edmund G.
Nagle, Bloomfield Hills, Mich., assignors to Allen Industries, Inc., a corporation of Delaware
Filed Sept. 1, 1966, Ser. No. 576,667
7 Claims. (Cl. 280—150)

The present invention broadly relates to safety devices for use in various vehicle types, and more particularly, to a novel combination seat belt and upper torso restraint or shoulder harness which is particularly suitable for use in automotive-type vehicles for restricting excessive movement of the driver and passengers as a result of rapid deceleration of the vehicle.

A variety of safety devices have heretofore been used, or proposed for use, in automotive vehicles to minimize injuries to both the driver and passengers as a result of a rapid deceleration of the vehicle because of impact or quick braking. Of the several safety devices heretofore proposed, conventional seat belts are now in widespread use and have been found effective in restraining unwanted forward movement of the lower torso of vehicle occupants during periods of rapid vehicle deceleration. However, the momentum of the upper torso of the driver and passengers during such rapid deceleration has occasioned injuries to vehicle occupants in some instances as a result of the forward and downward movement of the upper torso and its coming into contact with structural components and appointments within the vehicle interior. To overcome this problem, a variety of upper torso restraints have been proposed to restrict movement of the upper torso and are employed either in lieu of the conventional seat belts or operate in conjunction therewith.

The increased emphasis on vehicle safety has occasioned an increasing need for a safety device which not only serves to restrict unwanted movement of the occupants of automotive vehicles during severe deceleration, but which can be conveniently and quickly engaged and adjusted to occupants of different size serving to further encourage the use of the safety device. A problem has been created by some combination safety devices heretofore known in which the entire device must be worn by the occupant or else it is entirely inoperative as a safety device.

It is accordingly a principal object of the present invention to provide an improved safety device for occupants of vehicles which overcomes the problems and disadvantages of safety devices of similar types heretofore known.

Another object of the present invention is to provide an improved safety device comprising a combination seat belt and upper torso restraint which is quickly and easily installed, and is readily adjusted to accommodate occupants of different size.

Still another object of the present invention is to provide an improved combination seat belt and upper torso restraint wherein the upper torso portion of the safety harness is automatically adjusted in response to an adjustment of the seat belt portion thereof enabling limited movement of the vehicle occupant within the interior of the vehicle as is necessitated in operating the various controls and mechanisms therein, but preventing unwanted movement through a greater magnitude during periods of excessive deceleration of the vehicle.

A further object of the present invention is to provide a novel safety device wherein the seat belt portion thereof can be effectively worn without necessitating the wearing of the upper torso restraint, which at times may not be desired by the vehicle occupant.

A still further object of the present invention is to provide a novel combination seat belt and upper torso restraint which is of simple design, of simple vehicle installation, of safe and convenient use, and of economical manufacture.

The foregoing and other objects and advantages of the present invention are achieved by an improved combination seat belt and upper torso restraint or shoulder harness which comprises a first anchor to which a first strip is connected, and which is adapted to extend upwardly and over the waist region of an occupant of the vehicle, and a second anchor affixed to the vehicle framework to which a second strap is connected at a point intermediate the ends thereof which is provided with a loop enabling restricted relative longitudinal movement of the second strap between a first stop position and a second stop position spaced therefrom through an increment defined by the length of the loop. One end of the second strap is adapted to extend upwardly and rearwardly of the seat back and forwardly adjacent to the upper portion thereof for engaging an occupant of the seat in a region adjacent to each shoulder, thereby restricting unwanted relative forward movement of the upper torso of the occupant relative to the seat back. The other end portion of a second strap is adapted to extend upwardly and over the waist region of the occupant and is provided with suitable buckle means thereon which are adapted to coact with cooperating buckle means on the end portion of the first strap for adjustably tensioning the first and second straps so as to accommodate occupants of different size.

It is further contemplated, in accordance with the practice of the present invention, that the anchoring means for the first and second straps need not be disposed directly on the vehicle framework, such as the floor plan of an automobile body, but can be mounted on the seat proper in such cases where the seat framework itself is sufficiently rigid to provide adequate mounting means. It is also contemplated that the first anchor may be in the form of a retracting device for retracting the first strap to a compact, stored position during periods of nonuse of the safety device. In accordance with a preferred embodiment of the present invention, the rear seat back is preferably formed with a suitable upwardly extending tunnel, which may be recessed within the seat back structure itself, or affixed to the rear surface of the seat back through which the upper end of the second strap extends, and is guided therein so as to retain the upper torso restraint portion thereof in a position which facilitates an occupant's accessibility to the engaging means thereon. Preferably, the tunnel is formed with suitable stop means therein so as to restrict downward movement of the upper engaging means beyond a preselected level at which the engaging means are at all times accessible to an occupant.

Other objects and advantages of the present invention will become apparent upon a reading of the following description, taken in conjunction with the accompanying drawings, wherein:

FIGURE 1 is a fragmentary side elevational view of a seat and an occupant wearing a safety device constructed in accordance with the present invention;

FIGURE 2 is a perspective view of the strap components and anchoring means comprising the combination safety belt and upper torso restraint;

FIGURE 3 is a fragmentary side elevational view similar to that shown in FIGURE 1, but wherein only the seat belt portion of the device is being worn by the occupant, while the shoulder harness portion thereof is retracted within a suitable tunnel affixed to the rear surface of the seat back;

FIGURE 4 is a fragmentary enlarged plan view of the rear seat back and tunnel as viewed in the direction of the arrow indicated at 4 in FIGURE 3;

FIGURE 5 is an enlarged transverse sectional view through the tunnel and rear seat back shown in FIGURE 4, and taken along the line 5—5 thereof;

FIGURE 6 is an enlarged fragmentary longitudinal sectional view through the strap and stop means incorporated in the tunnel shown in FIGURE 4, and taken along the line 6—6 thereof; and FIGURE 7 is a fragmentary side elevational view similar to that shown in FIGURE 1, but wherein the anchoring means for the first and second straps are affixed directly to the seat framework.

Referring now in detail to the drawings, and as may be best seen in FIGURES 1 and 2, the safety device comprising the present invention is illustrated as being applied to an occupant seated in the right-hand portion of a seat assembly 10 with the safety device 12 in an appropriately adjusted position. It will be appreciated by those skilled in the art that the safety device 12 is equally applicable for use in the driver's seat, as well as in other seats, for vehicle occupants including so-called "bucket-type" seats, as well as bench-type seats.

The seat assembly 10, as shown in FIGURE 1, comprises a seat frame 14, including a seat proper 16, and a seat back 18 mounted thereon, which are of a suitable resilient cushioning construction of the several types well known in the art. The seat frame 14 is mounted on the vehicle framework, such as the floor pan 20, or to other suitable structural components of the vehicle body.

The safety device 12, as illustrated in FIGURE 2, comprises a first strap 22, which is adapted to be securely anchored at one of its ends, such as by means of a first anchor bracket 24, including a U-shaped member 26 around which a loop 28, formed in the end of the first strap 22, is disposed in engagement. It will be appreciated that alternative satisfactory anchoring brackets can be employed for securing one end portion of the first strap 22, including a retractor device indicated at 30, of either of the several types well known in the art which are adaptable for retracting the first strap exposing only the outer end portion thereof during periods of nonuse. Retractor device of the foregoing type serve to store the strap in a rolled condition and from which the strap is withdrawn at the time of its intended use to its full extended length.

The first strap 22 is adapted to extend upwardly and over the waist region of the seat occupant forming a portion of the seat belt. In the exemplary embodiment shown, the upper end portion of the first strap 22 is formed with a suitable tip 32 to prevent unraveling thereof, and to further facilitate its alignment and engagement with a buckle 34 affixed to the end portion of a second strap 36. The buckle 34, as illustrated in FIGURE 2, is of the so-called cam-type providing a metal-to-web interlock for adjustably tensioning the seat belt to accommodate occupants of different physical stature. It will be understood that alternative buckle designs can be satisfactorily employed in accordance with the safety device comprising the present invention, including the so-called metal-to-metal buckles which provide for adjustability of the end portions of the first strap and the second strap. In the exemplary buckle 34 shown in the drawings, a pivotally mounted clamp member 38 is affixed to the buckle frame 40 and the end portion of the first strap is adapted to pass therebetween, effecting a clamping of the first strap in a preselected adjusted position. The buckle is released by simply pivoting the clamp member 38 to a raised position, or in a counterclockwise direction, as viewed in FIGURE 2, in a manner well known in the art, enabling extraction of the first strap from between the clamping action of the clamp member 38 and the buckle frame 40.

The second strap 36, as best seen in FIGURE 2, is of an elongated construction and is formed with a loop 42 at a point intermediate the ends thereof as defined by a strap 44 which is securely fastened, such as by means of sewing or stitching 46, to spaced portions of the second strap 36. The second strap, as shown in FIGURES 1 and 2, is secured to a suitable anchor bracket 48, including a U-shaped member 50, having a pair of cross bars 49 and 51. The second strap is arranged relative to the anchor bracket 48 so that the cross bar 49 thereof extends through the loop 42, restricting relative longitudinal movement therebetween from a first stop position to a second stop position longitudinally spaced therefrom as defined by the longitudinal distance between the stitchings 46 securing the strap 44 to the second strap 36. The second strap is illustrated in FIGURES 1 and 2 with the anchor bracket 48 disposed at an intermediate portion between the ends of the loop 42, which is characteristic of its position when both the upper torso restraint and seat belt portion are worn by an occupant. The length of the strap 44, which in turn defines the size of the loop 42, and the distance of relative longitudinal movement of the second strap relative to the anchor bracket 48 can be varied and is selected so as to enable sufficient movement to permit the upper torso restraint portion to be worn by occupants of substantially divergent physical sizes. When the upper torso restraint is appropriately adjusted, the anchor bracket 48 is disposed at a position intermediate the ends of the loop as defined by the stitching 46.

The anchor bracket 48 is illustrated in its preferred form in which it includes the second cross bar 51, which overlies the outer surface of the strap 44, serving to guide its movement during longitudinal adjustment of the second strap 36. While the second cross bar 51 is not necessary for satisfactory operation of the safety device, it provides for improved alignment between the straps 36 and 44 in all moved positions thereof, and accordingly, constitutes a preferred construction.

The upper torso restraint or shoulder harness of the safety device, in accordance with the exemplary embodiment illustrated in FIGURE 2, comprises a pair of straps 52, the ends of which are disposed in overlapping relationship adjacent to the end portion of the second strap 36, and extend preferably angularly from the longitudinal axis thereof, so as to define two loops which are securely fastened, such as by means of stitching 54, to the second strap 36. The two loops as defined by the straps 52 serve as engaging means of the upper torso in a region adjacent to the shoulder of the occupant, as is best illustrated in FIGURE 1. The upper torso restraint is simply installed by the occupant by inserting his arms through the loops defined by the shoulder straps 52, and by thereafter buckling the other ends of the first and second straps, such as by means of the buckle 34, to provide for an appropriate tensioning of the upper torso restraint and the seat belt portion in a manner as illustrated in FIGURE 1. As will be noted in FIGURE 1, the second strap 36 is adapted to extend upwardly adjacent to the back surface of the seat back 18 and thence over the top edge thereof into encircling engagement around the shoulder region of the occupant. The other end of the second strap is adapted to extend upwardly through a suitable grommet or tubular member 56 angularly disposed through the lower portion of the seat frame and extends around and over the waist of the occupant for engagement with the other upwardly extending end of the first strap 22. The use of a tubular member 56 is not necessary when the seat construction is such to permit access between the rear surface of the seat back and the upper surface of the seat proper.

The advantages of the combination seat belt and upper torso restraint comprising the present invention is apparent from FIGURE 3, wherein the safety device is illustrated with only the seat belt portion thereof being worn by the occupant, and while the upper torso restraint is disposed in an inoperative condition. The significance of the loop 42 in the second strap is apparent from the adjusted position of the safety device as illustrated in FIGURE 3. As will be noted, movement of the second strap upwardly through the tubular member 56, effecting relative movement thereof with respect to the anchor bracket 48, continues until the end of the loop 42 is attained, at which point no further extension of the buckle end portion of the second strap is feasible forming a positive anchor of the seat belt portion of the second strap. Accordingly, appropriate adjustment of the buckle 34 relative to the first strap 22 enables appropriate positive adjustment of the safety device wherein the seat belt portion is entirely effective as a lower torso restraint independent of the upper torso restraint.

At such time that the occupant also desires to wear the upper torso restraint, the buckle 34 is simply released, enabling a rearward withdrawal of the second strap to a position wherein the loop 42 is disposed relative to the bracket 48, as depicted in FIGURE 1, enabling the occupant to insert his arms through the straps 52. Thereafter, the buckle 34 is again appropriately adjusted along the end portion of the first strap 22 such that both the upper torso restraint and the seat belt portion are in firm, yet not uncomfortable, restraining relationship around the upper and lower torso of the occupant. In this latter instance, the adjustment of the seat belt portion serves to simultaneously adjust the appropriate tension applied to the upper torso restraint so as to maintain the occupant's upper torso in an appropriate upright position.

In accordance with a preferred embodiment of the present invention, the portion of the second strap 36, extending upwardly adjacent to the rear surface of the seat back, is preferably guidably mounted within a suitable enclosure such as a tunnel member 58, as best seen in FIGURES 3-6 inclusive. In the exemplary embodiment shown, the tunnel member 58 is in the form of an elongated U-shaped housing, which is adapted to be affixed to the outer surface or sheet 60 (FIGURE 5) of the rear face of the seat back, and through which the upper portion of the shoulder harness extends. The upper end portion of the tunnel member 58, as shown in FIGURE 4, is preferably of an outwardly flared configuration, indicated at 62, to facilitate an outward angular guidance of the two loop-shaped shoulder straps 52 which are shown in FIGURE 4 in a retracted, stored position. In the position as shown in FIGURES 3 and 4, the outer end portions of the shoulder straps 52 extend slightly beyond the upper edge portion of the tunnel member 58 so as to facilitate grasping thereof by the occupant and a withdrawal of the shoulder harness from a stored position to a fully extended position, such as illustrated in FIGURE 1. Complete withdrawal of the upper torso restraint is restricted in response to engagement of the stitched end of the loop by the cross bar 49.

To prevent downward movement of the shoulder strap portion of the second strap when in a stored position beyond that position as shown in FIGURE 4, the tunnel member 58 is preferably further provided with a U-shaped bracket 64, having a central web section 66, which is spaced from the sheet 60 a distance enabling relative sliding movement of the second strap 36 therebetween. The upper edge of the U-shaped bracket 64, as is best seen in FIGURE 6, is adapted to engage the lower edges of the shoulder straps 52 when they attain the fully stored position, preventing further downward movement of the shoulder harness portion beyond a stored position as shown in FIGURE 4.

The foregoing arrangement of the tunnel member 58 provides for further neatness and assures accessibility of the upper torso restraint, while concurrently protecting it from inadvertent damage. It will be understood that while the tunnel member 58 has been shown in FIGURES 3-6 to be affixed to the exterior rear face of the seat back, it is also contemplated that the tunnel member, incorporating the suitable stop means therein, can be constructed within the internal confines of the seat back frame and/or cushion in a manner similar to the tubular member 56, through which the opposite end of the second strap extends.

The first strap 22, the second strap 36, the strap 44 and the shoulder straps 52, comprising the safety device 12, may be of any suitable flexible material which is of sufficient tensile strength to withstand the forces imposed thereon, and of sufficient abrasion resistance to withstand relative sliding movement thereof with respect to the brackets and other associated structural components coming in contact therewith. Conventionally, the several straps comprising the safety device are comprised of woven webbing material of either natural or synthetic yarns, as well as combinations thereof, forming a pliable flexible strap which can further be dyed to harmonize with the interior decor of the vehicle.

It is also contemplated that when seat frames are employed which in and of themselves are rigidly affixed to the vehicle framework, the anchoring devices for the seat strap portions can be directly affixed to the seat framework rather than to the floor pan or other vehicle structure as illustrated in FIGURES 1 and 2. As shown in FIGURE 7, an anchor bracket 48' is directly attached to a seat frame 14' to which the second strap 36' of the safety device 12' is adjustably connected. Similarly, a first anchor bracket 24' is connected to the lower portion of the seat frame 14' to which in turn the end of the first strap 22' is securely fastened. In all other respects, the alternative arrangement, as shown in FIGURE 7, is identical to that as previously described in connection with FIGURES 1-6, deviating only in regard to the relative disposition of the anchoring brackets as clearly shown in the drawings.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A combination seat belt and upper torso restraint for an occupant of a seat of a vehicle, the seat including a seat back and a seat proper mounted on the vehicle framework comprising first anchoring means on the vehicle framework, first strap means connected to said first anchoring means and adapted to extend upwardly and over the waist region of an occupant, second anchoring means on the vehicle framework, second strap means formed with loop means disposed intermediate of the ends thereof, said loop means engageably connected to said second anchoring means and providing relative longitudinal movement of said second strap means between a first stop position and a second stop position spaced therefrom as defined by the length of said loop means, one end portion of said second strap means adapted to extend upwardly and rearwardly of the seat back and forwardly adjacent the upper edge thereof and formed with engaging means for engaging an occupant's upper torso, the other end portion of said second strap means adapted to extend forwardly around an occupant's waist region and further including coacting means thereon for engaging mutual coacting means on the end portion of said first strap means for adjustably tensioning said first and said second strap means.

2. The combination seat belt and upper torso restraint as described in claim 1, wherein said engaging means comprise a pair of straps each defining a loop affixed to and extending from said one end portion of said second strap means for removably receiving the arms of an occupant and restraining the upper torso adjacent to the shoulder region thereof.

3. The combination seat belt and upper torso restraint as described in claim 1, wherein said first and said second anchoring means are affixed to the floor pan of a vehicle.

4. The combination seat belt and upper torso restraint as described in claim 1, wherein said first and said second anchoring means are affixed to the seat framework.

5. The combination seat belt and upper torso restraint as described in claim 1, wherein said first anchoring means includes retracting means for retracting said first strap means to a clearance position when not in use.

6. The combination seat belt and upper torso restraint as described in claim 1, wherein said one end portion of said second strap means extends upwardly within tunnel means formed on the rear seat back for guidably retaining the engaging means thereon in a position adjacent to the upper edge of the seat back.

7. The combination seat belt and upper torso restraint as described in claim 6, wherein said tunnel means includes stop means for restricting downward movement of said engaging means beyond a preselected position.

References Cited

UNITED STATES PATENTS

| | | | |
|---|---|---|---|
| 2,879,078 | 3/1959 | Dewees | 280—150 |
| 3,236,540 | 2/1966 | Berton et al. | 280—150 |

LEO FRIAGLIA, *Primary Examiner.*

R. SONG, *Assistant Examiner.*